United States Patent
Smith et al.

(10) Patent No.: US 11,126,954 B2
(45) Date of Patent: Sep. 21, 2021

(54) SYSTEMS AND METHODS FOR AUTOMATICALLY REQUESTING DELIVERY DRIVERS FOR ONLINE ORDERS

(71) Applicant: WAL-MART STORES, INC., Bentonville, AR (US)

(72) Inventors: Austin Lee Smith, Burlingame, CA (US); Vidyanand Krishnan, Sunnyvale, CA (US); Michael Gilbert Ebener, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 427 days.

(21) Appl. No.: 15/636,296

(22) Filed: Jun. 28, 2017

(65) Prior Publication Data
US 2019/0005449 A1 Jan. 3, 2019

(51) Int. Cl.
*G06Q 30/06* (2012.01)
*G06Q 10/08* (2012.01)
*G06Q 10/10* (2012.01)

(52) U.S. Cl.
CPC ..... *G06Q 10/0838* (2013.01); *G06Q 10/0836* (2013.01); *G06Q 10/1095* (2013.01); *G06Q 30/0633* (2013.01)

(58) Field of Classification Search
CPC .......... G06Q 10/0836; G06Q 10/0838; G06Q 10/1095; G06Q 30/0633
See application file for complete search history.

(56) References Cited

U.S. PATENT DOCUMENTS

| | | | |
|---|---|---|---|
| 10,395,290 B1* | 8/2019 | Koo | H04M 3/5233 |
| 2004/0068443 A1 | 4/2004 | Hopson et al. | |
| 2009/0281921 A1 | 11/2009 | Foster et al. | |
| 2014/0052661 A1* | 2/2014 | Shakes | G06Q 10/0836 |
| | | | 705/339 |
| 2014/0095350 A1 | 4/2014 | Carr et al. | |
| 2014/0278635 A1* | 9/2014 | Fulton | G06Q 10/063112 |
| | | | 705/7.14 |

(Continued)

OTHER PUBLICATIONS

U.S. Appl. No. 15/339,808, filed Oct. 31, 2016.
https://curbside.com/faq/; 5 pages; 2016.

*Primary Examiner* — Renae Feacher
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving delivery orders and/or pickup orders from customers for pickup and/or delivery of the orders during a predetermined window of time, receiving an additional delivery order from an additional customer for an additional pickup and/or delivery of the additional order to the additional customer by a delivery driver during the predetermined window of time, determining if a pickup area at the store exceeds a predetermined level of congestion during the predetermined window of time, and, if the pickup area at the store does not exceed the predetermined level of congestion during the predetermined window of time, transmitting an additional delivery request to the delivery driver to fulfill the additional delivery order during the predetermined window of time.

20 Claims, 5 Drawing Sheets

(56) References Cited

U.S. PATENT DOCUMENTS

| | | | |
|---|---|---|---|
| 2014/0379529 A1* | 12/2014 | Agasti | H04W 4/12 |
| | | | 705/26.81 |
| 2015/0057025 A1* | 2/2015 | Malik | H04W 4/023 |
| | | | 455/456.3 |
| 2015/0206093 A1 | 7/2015 | Trew et al. | |
| 2015/0242918 A1 | 8/2015 | McCarthy | |
| 2016/0063604 A1 | 3/2016 | Shaffer et al. | |
| 2016/0071056 A1* | 3/2016 | Ellison | G06Q 10/08355 |
| | | | 705/338 |
| 2016/0148300 A1 | 5/2016 | Carr et al. | |
| 2016/0203543 A1 | 7/2016 | Snow | |
| 2016/0247113 A1 | 8/2016 | Rademaker | |
| 2016/0314429 A1 | 10/2016 | Gillen et al. | |
| 2017/0024805 A1* | 1/2017 | Tepfenhart, Jr. | G06Q 30/0635 |
| 2017/0069013 A1 | 3/2017 | Castillo | |
| 2017/0124511 A1* | 5/2017 | Mueller | H04W 4/50 |
| 2017/0344010 A1* | 11/2017 | Rander | G01C 21/3438 |

\* cited by examiner

400

---

405 – Receiving a plurality of orders from a plurality of electronic devices of a plurality of customers.

↓

410 – Receiving an additional delivery order from an electronic device of an additional customer for an additional pickup at the store by a second delivery driver during the predetermined window of time.

↓

415 – Transmitting a first delivery request to the first delivery driver during the predetermined window of time.

↓

420 – At a first time during the predetermined window of time, determining if a designated pickup area at the store exceeds a predetermined level of congestion.

↓

425 – If the designated pickup area at the store does not exceed the predetermined level of congestion during the predetermined window of time as determined at the first time, transmitting an additional delivery request to the second delivery driver during the predetermined window of time.

↓

430 – If the designated pickup area at the store exceeds the predetermined level of congestion during the predetermined window of time as determined at the first time, withholding transmitting the additional delivery request to the second delivery driver until the designated pickup area at the store does not exceed the predetermined level of congestion during the determined window of time.

FIG. 4

SYSTEMS AND METHODS FOR AUTOMATICALLY REQUESTING DELIVERY DRIVERS FOR ONLINE ORDERS

TECHNICAL FIELD

This disclosure relates generally to automatically requesting delivery drivers for online orders based on a level of congestion in a designated pickup area of a store.

BACKGROUND

Many customers of retail or grocery stores now desire the convenience of having their orders delivered to their homes and/or picking up their already-collected orders at a designated area of the store. These orders are often made online by the customers using a website or mobile application for the store. When numerous pickup orders and delivery orders are received by the store, it is likely that many of the orders will be scheduled for pickup and/or delivery during the same predetermined window of time. With so many pickup orders and/or delivery orders being fulfilled during the same window of time, congestion can occur in a pickup area for orders at the store. Congestion in the pickup area can result in an increased cost to the store due to spoilage of items in the orders and/or a cost of paying delivery drivers while the delivery drivers wait to pick up the order.

BRIEF DESCRIPTION OF THE DRAWINGS

To facilitate further description of the embodiments, the following drawings are provided in which:

FIG. 4 is a flowchart for a method, according to certain embodiments; and

Figure 1:
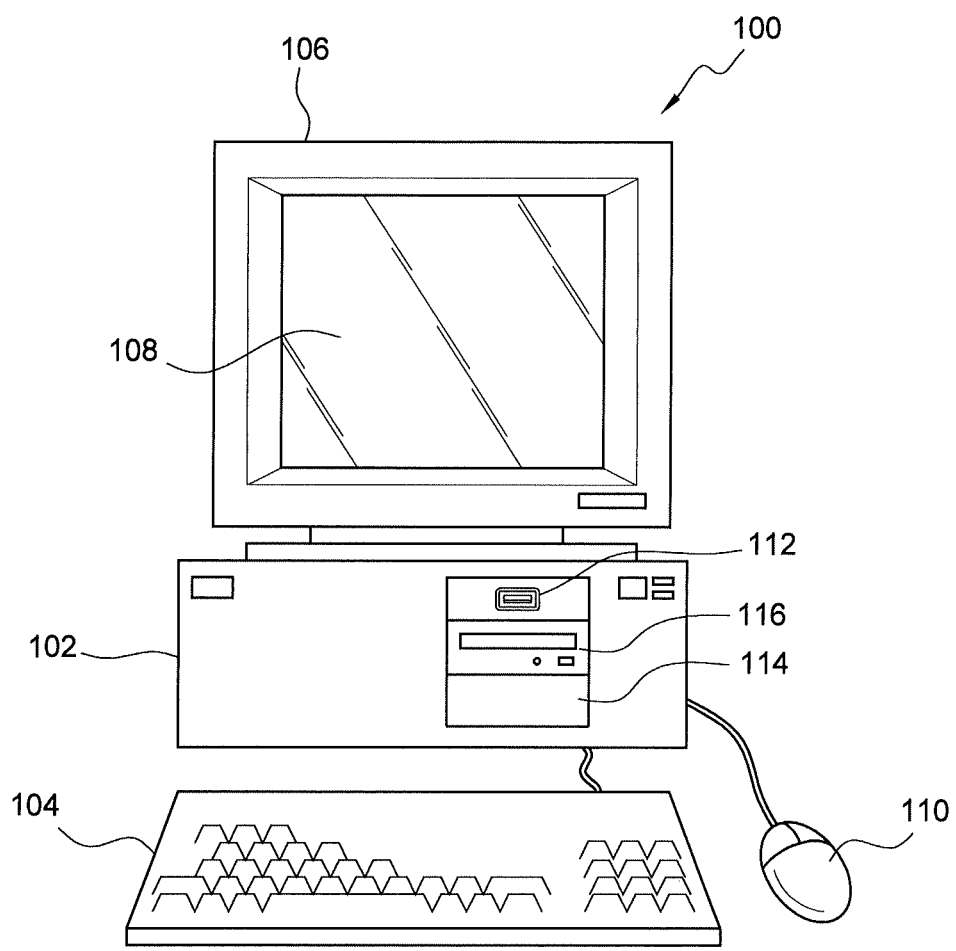
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving a plurality of orders from a plurality of electronic devices of a plurality of customers. Each order of the plurality of orders can comprise one of (1) a pickup order for a customer pickup of the pickup order at a store by a customer of the plurality of customers, or (2) a delivery order for a driver pickup of the delivery order at the store by a first delivery driver during a predetermined window of time and also a first delivery of the delivery order to the customer by the first delivery driver. The one or more storage modules can be further configured to run on the one or more processing modules and perform an act of receiving an additional delivery order from an electronic device of an additional customer for an additional pickup at the store by a second delivery driver during the predetermined window of time and an additional delivery of the additional delivery order to the additional customer by the second delivery driver. The one or more storage modules can be further configured to run on the one or more processing modules and perform an act of, for each order of the plurality of orders comprising the delivery order, transmitting a first delivery request to an electronic device of the first delivery driver during the predetermined window of time to fulfill the driver pickup of the delivery order at the store by the first delivery driver during the predetermined window of time and also the first delivery of the delivery order to the customer. The one or more storage modules can be further configured to run on the one or more processing modules and perform an act of, at a first time during the predetermined window of time, determining if a designated pickup area at the store exceeds a predetermined level of congestion. The one or more storage modules can be further configured to run on the one or more processing modules and perform an act of, if the designated pickup area at the store does not exceed the predetermined level of congestion during the predetermined window of time as determined at the first time, transmitting an additional delivery request to an electronic device of the second delivery driver during the predetermined window of time to fulfill the additional pickup of the additional delivery order at the store by the second delivery driver during the predetermined window of time and the additional delivery of the additional delivery order to the additional customer.

Various embodiments include a method. The method can include receiving a plurality of orders from a plurality of electronic devices of a plurality of customers. Each order of the plurality of orders can comprise one of (1) a pickup order for a customer pickup of the pickup order at a store by a customer of the plurality of customers, or (2) a delivery order for a driver pickup of the delivery order at the store by a first delivery driver during a predetermined window of time and also a first delivery of the delivery order to the customer by the first delivery driver. The method also can include receiving an additional delivery order from an electronic device of an additional customer for an additional pickup at the store by a second delivery driver during the predetermined window of time and an additional delivery of the additional delivery order to the additional customer by the second delivery driver. The method also can include for each order of the plurality of orders comprising the delivery order, transmitting a first delivery request to an electronic device of the first delivery driver during the predetermined window of time to fulfill the driver pickup of the delivery order at the store by the first delivery driver during the predetermined window of time and also the first delivery of the delivery order to the customer. The method also can include, at a first time during the predetermined window of time, determining if a designated pickup area at the store exceeds a predetermined level of congestion. The method also can include, if the designated pickup area at the store does not exceed the predetermined level of congestion during the predetermined window of time as determined at the first time, transmitting an additional delivery request to an electronic device of the second delivery driver during the predetermined window of time to fulfill the additional pickup of the additional delivery order at the store by the second delivery driver during the predetermined window of time and the additional delivery of the additional delivery order to the additional customer.

Figure 2:
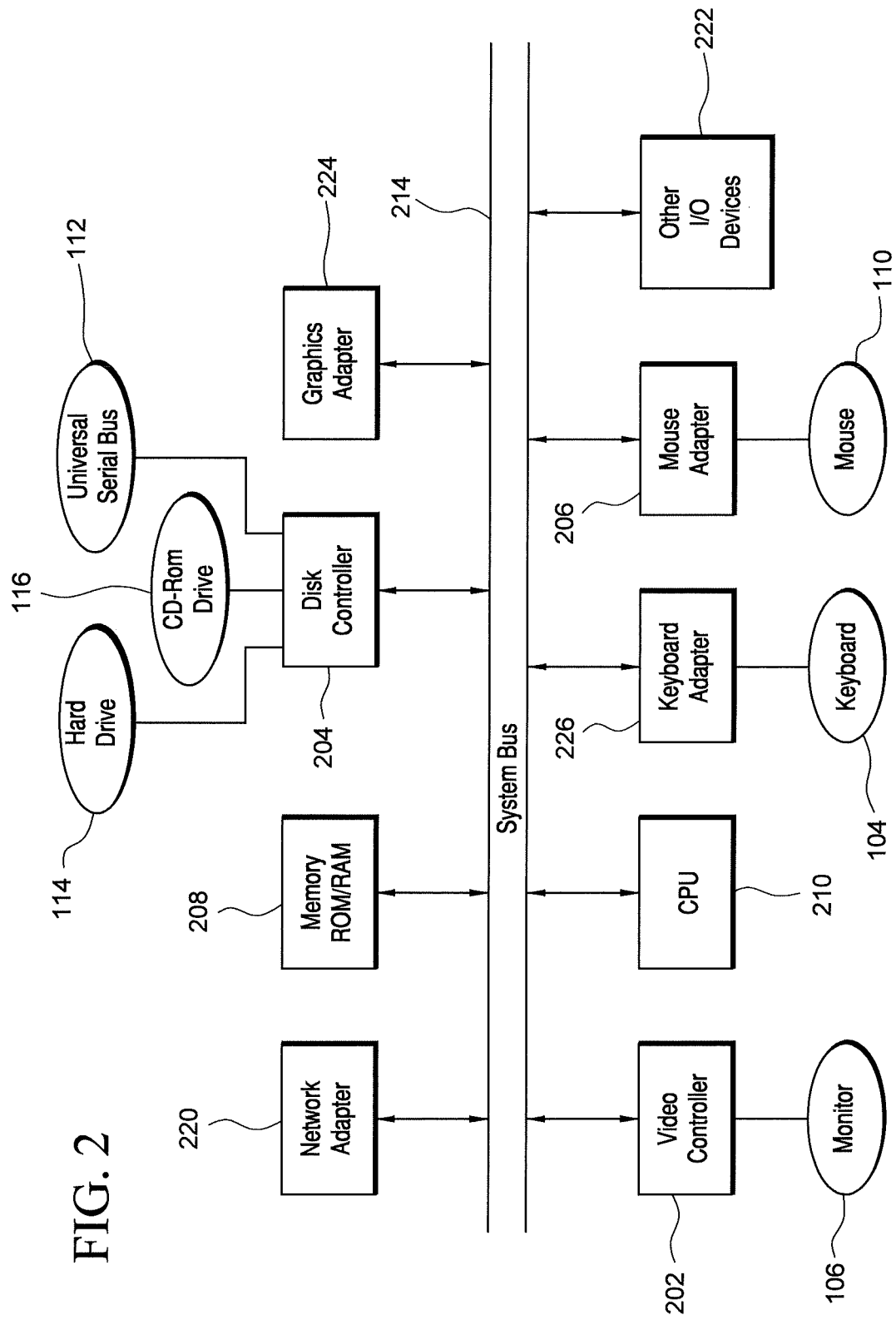
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
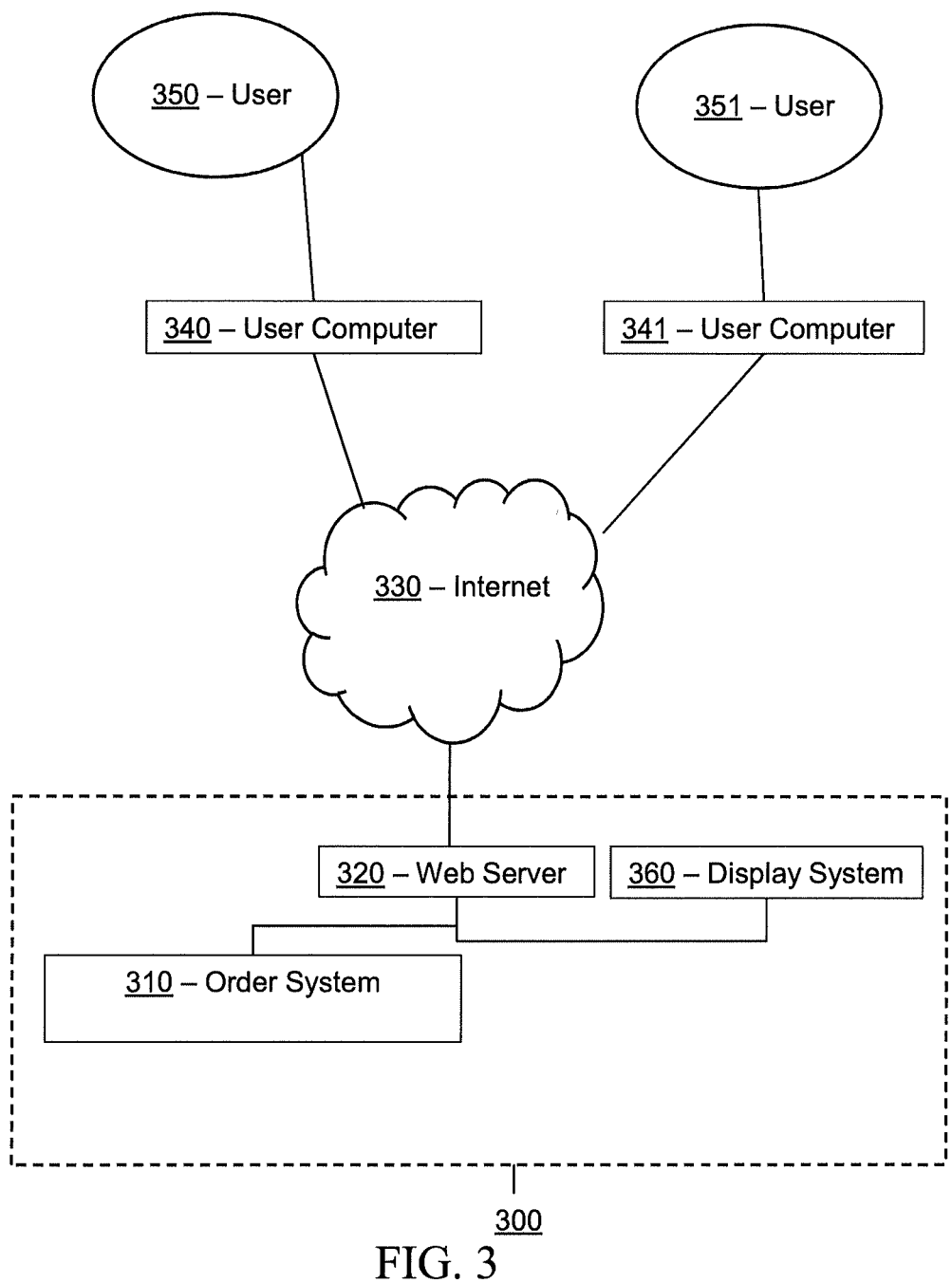
FIG. 3 illustrates a representative block diagram of a system, according to an embodiment.

Turning ahead in the drawings, FIG. 3 illustrates a block diagram of a system 300 that can be employed for automatically requesting delivery drivers for online orders based on congestion in the pickup area, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include an order system 310, a web server 320, and a display system 360. Order system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of order system 310, web server 320, and display system 360. Additional details regarding order system 310, web server 320, and display system 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, order system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) order system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of order system 310, web server 320, and/or display system 360. In a similar manner, the processing module(s) and the memory storage module(s) can be local and/or remote to each other.

In many embodiments, order system 310, web server 320, and/or display system 360 can be configured to communicate with one or more user computers 340 and 341. In some embodiments, user computers 340 and 341 also can be referred to as customer computers. In some embodiments, order system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, order system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, order system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between order system 310, web server 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
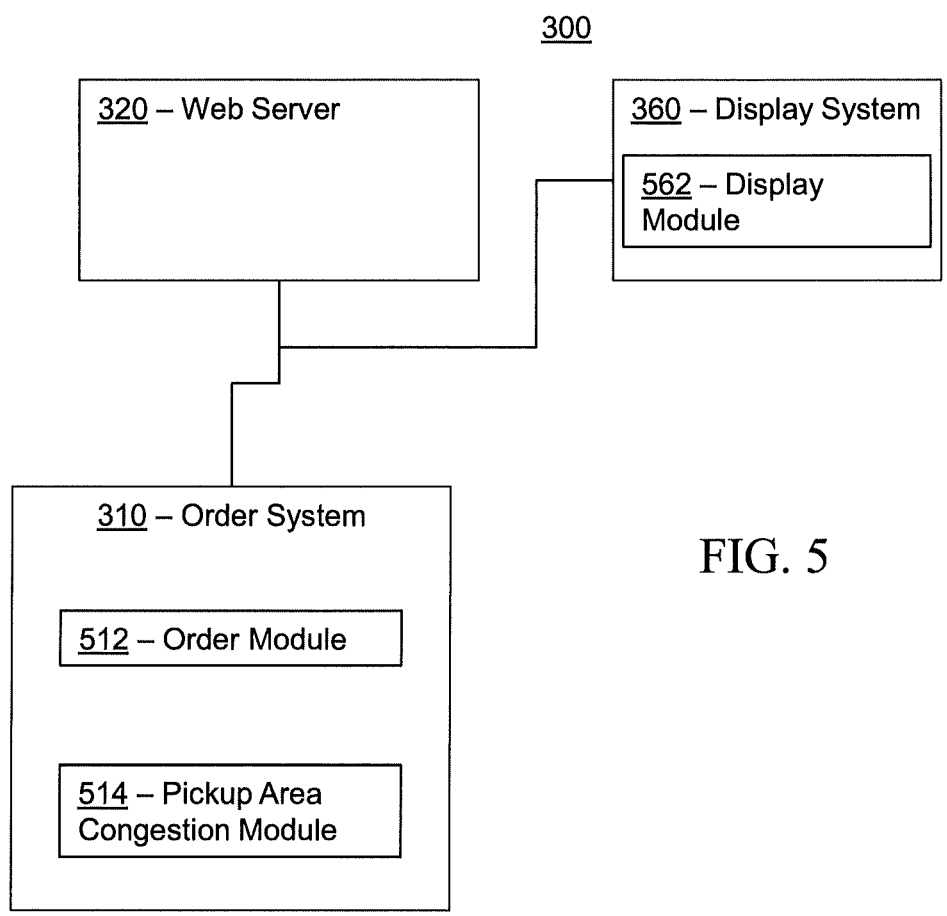
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, and/or 562 (FIG. 5). Such non-transitory memory storage modules can be part of a computer system such as order system 310, web server 320, and/or display system 360 (FIGS. 3 & 5). The processing module(s) can be similar or identical to the processing module(s) described above with respect to computer system 100 (FIG. 1).

As shall be described in greater detail below, one or more embodiments of method 400 can be used to determine, based on congestion at a pickup area for a store, when a delivery driver is called to pick up a delivery order at the store. In some embodiments, mobile check-in data and/or the current wait time at the pickup area can be used to determine when the delivery driver is called to pick up the delivery order at the store. If, for example, there is congestion in the pickup area and/or a long wait for picking up other orders, system 300 (FIG. 3) can withhold transmitting a delivery request to request a delivery driver for an additional order.

In many embodiments, method 400 can comprise an activity 405 of receiving a plurality of orders from a plurality of electronic devices of a plurality of customers. Each order of the plurality of orders can comprise one of a pickup order or a delivery order. A pickup order can comprise an order that is made by a customer for a customer pickup of the pickup order at a store by the customer. A delivery order can comprise an order that is made by a customer for a driver pickup of the delivery order at the store by a delivery driver and also a delivery of the delivery order to the customer by the delivery driver. In some embodiments, one or more different drivers can be used or called upon by the store to deliver orders to customers. Thus, the same delivery driver can, in certain applications of method 400, be used to deliver different delivery orders of the plurality of delivery orders to one or more of the plurality of customers and/or others. Although references are made to deliveries of orders to customers, it is understood that the systems and methods can include a customer placing an order for delivery to another person who may or may not be a customer. Also, in some embodiments, any of the drivers referenced in method 400 and throughout this disclosure can comprise an employee of the store and/or a crowd-sourced driver from a third-party delivery service.

In many embodiments, a delivery driver is not assigned to deliver each delivery order of the plurality of orders when the customer places the delivery order. Instead, in many embodiments, a delivery driver can be assigned to deliver each delivery order of the plurality of orders when a delivery request is made to the delivery driver by system 300 (FIG. 3). A delivery request from system 300 (FIG. 3) to a third-party delivery service can be made by placing a call to the third-party call center and/or the third-party delivery service application programming interface to request a delivery driver.

In some embodiments, a pickup order can comprise a pickup order for a customer pickup of the pickup order at the store during a specific predetermined window of time. Each customer can schedule a time for customer pickup of the pickup order, or alternatively, system 300 (FIG. 3) can automatically assign a predetermined window of time for the customer to pick up the pickup order. For example, a customer can place a pickup order to pick up the pickup order at the store during a predetermined window of time between 1 PM and 2 PM. In other embodiments, a pickup order can comprise a pickup order for a customer pickup of the pickup order at the store at any time. Each customer can schedule a time for customer pickup of the pickup order, or alternatively, system 300 (FIG. 3) can automatically assign a predetermined window of time for the customer to pick up the pickup order at the store.

Furthermore, in some embodiments, a delivery order can comprise a delivery order for a driver pickup of the delivery order at the store during a predetermined window of time and also for a driver delivery of the delivery order to the customer during the same or a different window of time. For example, a customer can place a delivery order for a delivery of the delivery order to the customer during a predetermined window of time between 1 PM and 2 PM. In such an example, the delivery order also can require a driver pickup of the order at the store during the same predetermined window of time between 1 PM and 2 PM, or during an earlier predetermined window of time, such as an earlier predetermined window of time between 12 noon and 1 PM, depending on the distance between the store and the delivery address specified by the customer, traffic conditions, weather conditions, etc.

In many embodiments, activity 405 and other activities in method 400 can comprise using a distributed network comprising distributed memory architecture to perform the associated activity. For example, a distributed network comprising distributed memory architecture can be used when each customer is reviewing items or products to put in the order and/or finalizing the order on a website of the store. This distributed architecture can reduce the impact on the network and system resources to reduce congestion in bottlenecks while still allowing data to be accessible from a central location.

In many embodiments, method 400 can be utilized when customers are placing orders on a website or application of a store. The orders can be placed by the customers using electronic devices, such as but not limited to mobile electronic devices like watches or phones, tablet computer electronic devices, desktop computer electronic devices, and the like. The orders placed by customers can be for one or more items sold by the store or retailer, including but not limited to groceries, electronics, clothing, media, equipment, and so on. In some embodiments, the website of the store can be associated with one or more brick and mortar retail stores within a predetermined proximity to the customer placing the order, one or more fulfillment centers, one or more distribution centers, warehouses, and the like.

Continuing with FIG. 4, method 400 also can comprise an activity 410 of receiving an additional delivery order from an electronic device of an additional customer. This additional delivery order can be for an additional pickup at the store by a delivery driver during the predetermined window of time. The delivery driver for the additional order can, in certain applications of method 400, be a same or a different delivery driver that picked up and delivered one or more orders of the plurality of orders referenced in activity 405. Thus, while reference is made to an additional or second delivery driver, it is contemplated in this disclosure that the additional or second delivery driver can, in certain applications of method 400, comprise the first delivery driver referenced in activity 405.

Furthermore, as noted above, in many embodiments, a delivery driver for the additional order is not assigned to deliver the additional delivery order when the additional customer places the additional delivery order. Instead, in many embodiments, a delivery driver can be assigned to deliver the additional delivery order when an additional delivery request is made to the delivery driver by system 300 (FIG. 3). An additional delivery request from system 300 (FIG. 3) to a third-party delivery service can be transmitted by placing a call to the third party call center and/or the third-party delivery service application programming interface to request a delivery driver.

In many embodiments, the additional delivery order can be for an additional pickup at the store by the delivery driver and an additional delivery of the additional delivery order to the additional customer by the second delivery driver. In many embodiments, the additional delivery order also can specify that the additional delivery is picked up at the store by the delivery driver during a predetermined window of time and delivered to the additional customer during the same or a different predetermined window of time that the additional delivery order is picked up at the store by the delivery driver.

Method 400 also can comprise an activity 415 of, for each order of the plurality of orders comprising the delivery order, transmitting a first delivery request to an electronic device of the delivery driver during the predetermined window of time. In some embodiments, activity 415 can occur before activity 410. The predetermined window of time can be the same or a different predetermined window of time referenced in activity 410. In many embodiments, the first delivery request can comprise a delivery request for the delivery driver to fulfill the driver pickup of the delivery order at the store by the delivery driver during the predetermined window of time and also the first delivery of the delivery order to the customer. Fulfillment of the delivery order also can comprise delivery of the delivery order to the customer at the same or a different predetermined window of time when the delivery order is picked up by the delivery driver. In many embodiments, the delivery request is made during the same predetermined window of time the delivery order is scheduled to be picked up and/or delivered by the delivery driver.

In many embodiments, activity 415 also can comprise coordinating displaying, for each order of the plurality of orders comprising the delivery order, a first delivery request on an electronic device of the third-party delivery service and/or the delivery driver. Similarly, activity 415 also can comprise generating instructions, for each order of the plurality of orders comprising the delivery order, for providing an interface on an electronic device of the third-party delivery service and/or the delivery driver that displays a first delivery request.

In some embodiments, activity 415 can comprise transmitting the first delivery request to a third-party delivery service, which then transmits the first delivery request to the delivery driver. For example, in some embodiments, a first delivery request from system 300 (FIG. 3) to a third-party delivery service can be transmitted by placing a call to the delivery service call center and/or sending a message to the third-party delivery service application programming interface to request a delivery driver.

When a plurality of pickup orders and a plurality of delivery orders are received by the store, it is likely that many of the orders will be scheduled for pickup and/or delivery during the same predetermined window of time. For example, a plurality of pickup orders can be scheduled for pickup at the store by the customer during a predetermined window of time between 1 PM and 2 PM, and a plurality of delivery orders also can be scheduled for pickup at the store by the delivery driver and/or delivery by the delivery driver to the customer during a predetermined window of time between 1 PM and 2 PM. Moreover, a plurality of customers without scheduled pickup times can arrive at the store during the same predetermined window of time of 1 PM and 2 PM. With so many pickup orders and/or delivery orders being fulfilled during the same window of time, congestion can occur in a pickup area for orders at the store. Congestion in the pickup area can result in an increased cost to the store due to spoilage of items in the orders, a cost of paying delivery drivers while the delivery drivers wait to pick up the order, and/or dissatisfied customers who do not return to the store.

To solve this problem, system 300 (FIG. 3) can determine a congestion level of a designated pickup area at the store. In many embodiments, the designated pickup area can comprise a plurality of parking spaces at the store. The designated pickup area also can comprise other areas at or near the store, such as but not limited to one or more drive-thru lanes, gardens, common areas, and the like. In many embodiments, method 400 also can comprise an activity 420 of determining if a designated pickup area at the store exceeds a predetermined level of congestion. Activity 420 can be performed at a first time during the predetermined window of time that the plurality of orders and/or the additional order are scheduled to be picked up at the store and/or delivered by the delivery driver. The predetermined levels of congestion can, in some embodiments, comprise (1) a percentage of the designated pickup area already occupied by customers and/or delivery drivers, and/or (2) a percentage of the designated pickup area expected to be occupied by customers and/or delivery drivers during at least a portion of the remaining predetermined period of time based on current mobile check-in data, anticipated arrival times based on global positioning system (GPS) map data, and/or historical data.

Furthermore, in some optional embodiments, activity 420 can comprise receiving mobile check-ins. Mobile check-ins can, for example, be received from customers and/or delivery drivers. More particularly, mobile check-ins can be received from customers of the plurality of customers for the customer pickups of the pickup orders of the plurality of orders. These mobile check-ins from the customers can indicate that the one or more customers are en route to the store or in the designated pickup area. Moreover, mobile check-ins can be received from delivery drivers for the delivery orders of the plurality of orders. These mobile check-ins from the delivery drivers can indicate that the delivery drivers are en route to the store or in the designated pickup area. Certain aspects of mobile check-ins are described in U.S. patent application Ser. No. 15/339,808 to Agarwal, et al., filed Oct. 31, 2016 and titled "Customer Check-In System and Non-Transitory Computer Readable Storage Media for Checking-In a Customer," the contents of which are all hereby incorporated by reference.

In many embodiments, activity 420 can comprise determining if the designated pickup area at the store exceeds the predetermined level of congestion using real-time congestion data of the designated pickup area and/or historical congestion data of the designated pickup area. In some embodiments, the real-time congestion data can comprise at least one of: (1) a number of the one or more mobile check-ins within a predetermined period of time, and/or (2) real-time congestion data from cameras monitoring the designated pickup area to determine (a) a number of vehicles in the designated pickup area and/or (b) customers and/or drivers in the designated pickup area. In some embodiments, the historical congestion data can be based on at least one of a number of customer pickups or a number of driver pickups at a particular time of day, during a particular day of a week, and/or during a particular day of a year. A particular day of the year can, in some embodiments, reflect the seasonality of orders. For example, the day before or after certain holidays such as Thanksgiving can historically include more pickup and/or delivery orders.

Once the congestion level in the designated pickup area has been determined, system 300 (FIG. 3) can, based on the congestion level in the designated pickup area, either transmit a delivery request for an additional delivery order or wait to transmit the delivery request for the additional delivery order. For example, if the designated pickup area at the store does not exceed the predetermined level of congestion during the predetermined window of time as determined at the first time, method 400 can comprise an activity 425 of transmitting an additional delivery request to an electronic device of the delivery driver during the predetermined window of time. The additional delivery request can comprise an additional delivery request for a delivery driver to fulfill the additional pickup of the additional delivery order at the store and the additional delivery of the additional delivery order to the additional customer. The additional delivery request also can schedule the additional pickup of the additional delivery order during the predetermined window of time and/or the additional delivery of the additional delivery order to the additional customer during the same or different window of time as the additional pickup.

In some embodiments, activity 425 can comprise transmitting the additional delivery request to a third-party delivery service, which then transmits the delivery request to the delivery driver. For example, in some embodiments, an additional delivery request from system 300 (FIG. 3) to a third-party delivery service can be transmitted by placing a call to the delivery service call center and/or sending a message to the third-party delivery service application programming interface to request a delivery driver.

In many embodiments, activity 425 also can comprise coordinating displaying the additional delivery request on an electronic device of the third-party delivery service and/or the delivery driver. Similarly, activity 425 also can comprise generating instructions for providing an interface on an electronic device of the third-party delivery service and/or the delivery driver that displays an additional delivery request.

If the designated pickup area at the store exceeds the predetermined level of congestion during the predetermined window of time as determined at the first time, method 400 can optionally comprise an activity 430 of withholding or preventing transmitting the additional delivery request to the delivery driver until the designated pickup area at the store does not exceed the predetermined level of congestion during the determined window of time.

If the designated pickup area previously exceeded the predetermined level of congestion, system 300 (FIG. 3) can continuously or periodically determined if the designated pickup area exceeds the predetermined level of congestion. For example, in many embodiments, activity 430 also can comprise, at a second time during the predetermined window of time that is after the first time of activity 420, determining if the designated pickup area at the store exceeds the predetermined level of congestion.

If the designated pickup area at the store does not exceed the predetermined level of congestion during the predetermined window of time as determined at the second time, then activity 430 can further comprise transmitting the additional delivery request to the delivery driver during the predetermined window of time to fulfill the additional pickup of the additional delivery order at the store by the delivery driver and the additional delivery of the additional delivery order to the additional customer, as described above.

FIG. 5 illustrates a block diagram of a portion of system 300 comprising order system 310, web server 320, and display system 360, according to the embodiment shown in FIG. 3. Each of order system 310, web server 320, and display system 360 is merely exemplary and not limited to the embodiments presented herein. Each of order system 310, web server 320, and/or display system 360 can be employed in many different embodiments or examples not specifically depicted or described herein. In some embodiments, certain elements or modules of order system 310, web server 320, and/or display system 360, can perform various procedures, processes, and/or acts. In other embodiments, the procedures, processes, and/or acts can be performed by other suitable elements or modules.

In many embodiments, order system 310 can comprise non-transitory memory storage module 512. Memory storage module 512 can be referred to as order module 512. In many embodiments, order module 512 can store computing instructions configured to run on one or more processing modules and perform one or more acts of methods 400 (FIG. 4) (e.g., activity 405 of receiving a plurality of orders from a plurality of electronic devices of a plurality of customers, activity 410 of receiving an additional delivery order from an electronic device of an additional customer for an additional pickup at the store by a second delivery driver during the predetermined window of time, activity 415 of transmitting a first delivery request to the first delivery driver during the predetermined window of time, activity 425 of, if the designated pickup area at the store does not exceed the predetermined level of congestion during the predetermined window of time as determined at the first time, transmitting an additional delivery request to the second delivery driver during the predetermined window of time, and activity 430 of, if the designated pickup area at the store exceeds the predetermined level of congestion during the predetermined window of time as determined at the first time, withholding transmitting the additional delivery request to the second delivery driver until the designated pickup area at the store does not exceed the predetermined level of congestion during the determined window of time (FIG. 4)).

In many embodiments, order system 310 can comprise non-transitory memory storage module 514. Memory storage module 514 can be referred to as pickup area congestion module 514. In many embodiments, pickup area congestion module 514 can store computing instructions configured to run on one or more processing modules and perform one or more acts of methods 400 (FIG. 4) (e.g. activity 420 of, at a first time during the predetermined window of time, determining if a designated pickup area at the store exceeds a predetermined level of congestion (FIG. 4), and also an activity of, at a second time during the predetermined window of time that is after the first time, determining if the designated pickup area at the store exceeds the predetermined level of congestion).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., an activity of coordinating displaying a first delivery request on an interface of an electronic device of the first delivery driver during the predetermined window of time, an activity of, if the designated pickup area at the store does not exceed the predetermined level of congestion during the predetermined window of time as determined at the first time, coordinating displaying an additional delivery request on an interface of an electronic device of the second delivery driver during the predetermined window of time).

Although systems and methods for automatically requesting delivery drivers for online orders based on congestion in the pickup area have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and perform:
      receiving, at one or more servers of a distributed network, a plurality of orders from a plurality of electronic devices of a plurality of customers, each respective order of the plurality of orders comprising one of:
         (1) a respective pickup order for a customer pickup of the respective order at a respective store by a respective customer of the plurality of customers, or
         (2) a respective delivery order for a driver pickup of the respective order at the respective store by (a) a respective delivery driver during a respective predetermined window of time and (b) a respective delivery of the respective order to the respective customer by the respective delivery driver;
      receiving, at the one or more servers of the distributed network, an additional order from an additional electronic device of an additional customer for an additional driver pickup of the additional order at a first one of one or more respective stores by a second delivery driver during a first one of one or more respective predetermined windows of time and an additional delivery of the additional order to the additional customer by the second delivery driver, wherein:
         the one or more respective stores comprise the respective store; and
         the one or more respective predetermined windows of time comprise the respective predetermined window of time;
      when a first one of the plurality of orders comprises a first one of one or more respective delivery orders to be picked up at the first one of the one or more respective stores by a first one of one or more respective delivery drivers during the first one of the one or more respective predetermined windows of time, causing a first electronic device of the first one of the one or more respective delivery drivers to display a first delivery request to fulfill the driver pickup of the first one of the plurality of orders at the first one of the one or more respective stores by the first one of the one or more respective delivery drivers during the first one of the one or more respective predetermined windows of time, wherein:
         the one or more respective delivery orders comprise the respective delivery order; and
         the one or more respective delivery drivers comprise the respective delivery driver;
      at a first time during the first one of the one or more respective predetermined windows of time, determining, using (1) continuously received mobile check-ins and (2) at least one of (a) real-time congestion data of a designated pickup area of the first one of the one or more respective stores or (b) historical congestion data of the designated pickup area of the first one of the one or more respective stores, when the designated pickup area at the first one of the one or more respective stores exceeds a predetermined level of congestion, wherein the designated pickup area is for the driver pickup of the additional order at the first one of the one or more respective stores by the second delivery driver during the first one of the one or more respective predetermined windows of time; and
      when the designated pickup area at the first one of the one or more respective stores does not exceed the predetermined level of congestion during the first one of the one or more respective predetermined windows of time, as determined at the first time, causing a second electronic device of the second delivery driver to display an additional delivery request to fulfill the additional driver pickup of the additional order at the first one of the one or more respective stores by the second delivery driver during the first one of the one or more respective predetermined windows of time and the additional delivery of the additional order to the additional customer by the second delivery driver.

2. The system of claim 1, wherein the one or more non-transitory storage devices storing the computing instructions are further configured to run on the one or more processors and perform:
   when the designated pickup area at the first one of the one or more respective stores exceeds the predetermined level of congestion during the first one of the one or more respective predetermined windows of time:
      not causing the second electronic device of the second delivery driver to display the additional delivery request until the designated pickup area at the first one of the one or more respective stores falls below the predetermined level of congestion.

3. The system of claim 2, wherein the one or more non-transitory storage devices storing the computing instructions are further configured to run on the one or more processors and perform:
   when the designated pickup area at the first one of the one or more respective stores exceeds the predetermined level of congestion during the first one of the one or more respective predetermined windows of time, as determined at the first time:
      at a second time during the first one of the one or more respective predetermined windows of time that is after the first time, determining when the designated pickup area at the first one of the one or more respective stores exceeds the predetermined level of congestion; and when the designated pickup area at the first one of the one or more respective stores does not exceed the predetermined level of congestion during the first one of the one or more respective predetermined windows of time, as determined at the second time, causing the second electronic device of the second delivery driver to display the additional delivery request to fulfill the additional driver pickup of the additional order at the first one of the one or more respective stores by the second delivery driver during the first one of the one or more respective predetermined windows of time and the additional delivery of the additional order to the additional customer by the second delivery driver.

4. The system of claim 1, wherein determining when the designated pickup area at the first one of the one or more respective stores exceeds the predetermined level of congestion comprises:

determining when the designated pickup area at the first one of the one or more respective stores exceeds the predetermined level of congestion using both (a) the real-time congestion data of the designated pickup area of the first one of the one or more respective stores and (b) the historical congestion data of the designated pickup area of the first one of the one or more respective stores.

5. The system of claim 1, wherein:

the one or more non-transitory storage devices storing the computing instructions are further configured to run on the one or more processors and perform:

continuously receiving one or more mobile check-ins from:
(1) customers of the plurality of customers for customer pickups of the plurality of orders, the one or more mobile check-ins from the customers of the plurality of customers indicating that the customers are (i) en route to the first one of the one or more respective stores or (ii) in the designated pickup area of the first one of the one or more respective stores; or
(2) the one or more respective delivery drivers for the one or more respective delivery orders of the plurality of orders, the one or more mobile check-ins from the one or more respective delivery drivers indicating that the one or more respective delivery drivers are (i) en route to the first one of the one or more respective stores or (ii) in the designated pickup area of the first one of the one or more respective stores; and the real-time congestion data comprises at least one of:
a number of the one or more mobile check-ins within a predetermined period of time; or
real-time congestion data from cameras monitoring the designated pickup area of the first one of the one or more respective stores, the cameras configured to determine a number of vehicles in the designated pickup area of the first one of the one or more respective stores.

6. The system of claim 1, wherein (b) the historical congestion data is based on at least one of:
a number of customer pickups; or
a number of driver pickups at (1) a particular time of day, (2) during a particular day of a week, or (3) during a particular day of a year.

7. The system of claim 1, wherein:
a second order of the plurality of orders comprises the respective pickup order; and
the customer pickup of the respective pickup order at the respective store by the respective customer of the plurality of customers is scheduled during a predetermined window of time when the respective customer places the respective pickup order.

8. The system of claim 1, wherein:
the designated pickup area comprises a plurality of parking spaces at the first one of the one or more respective stores; and
the first one of the one or more respective delivery drivers and the second delivery driver comprise crowd-sourced delivery drivers for one or more third-party delivery services.

9. A method being implemented via execution of computing instructions configured to run at one or more processors and configured to be stored at non-transitory computer-readable media, the method comprising:

receiving, at one or more servers of a distributed network, a plurality of orders from a plurality of electronic devices of a plurality of customers, each respective order of the plurality of orders comprising one of:
(1) a respective pickup order for a customer pickup of the respective order at a respective store by a respective customer of the plurality of customers, or
(2) a respective delivery order for a driver pickup of the respective order at the respective store by (a) a respective delivery driver during a respective predetermined window of time and (b) a respective delivery of the respective order to the respective customer by the respective delivery driver;

receiving, at the one or more servers of the distributed network, an additional order from an additional electronic device of an additional customer for an additional driver pickup of the additional order at a first one of one or more respective stores by a second delivery driver during a first one of one or more respective predetermined windows of time and an additional delivery of the additional order to the additional customer by the second delivery driver, wherein:
the one or more respective stores comprise the respective store; and
the one or more respective predetermined windows of time comprise the respective predetermined window of time;

when a first one of the plurality of orders comprises a first one of one or more respective delivery orders to be picked up at the first one of the one or more respective stores by a first one of one or more respective delivery drivers during the first one of the one or more respective predetermined windows of time, causing a first electronic device of the first one of the one or more respective delivery drivers to display a first delivery request to fulfill the driver pickup of the first one of the plurality of orders at the first one of the one or more respective stores by the first one of the one or more respective delivery drivers during the first one of the one or more respective predetermined windows of time, wherein:
the one or more respective delivery orders comprise the respective delivery order; and
the one or more respective delivery drivers comprise the respective delivery driver;

at a first time during the first one of the one or more respective predetermined windows of time, determining, using (1) continuously received mobile check-ins and (2) at least one of (a) real-time congestion data of a designated pickup area of the first one of the one or more respective stores or (b) historical congestion data of the designated pickup area of the first one of the one or more respective stores, when the designated pickup area at the first one of the one or more respective stores exceeds a predetermined level of congestion, wherein the designated pickup area is for the driver pickup of the additional order at the first one of the one or more respective stores by the second delivery driver during the first one of the one or more respective predetermined windows of time; and when the designated pickup area at the first one of the one or more respective stores does not exceed the predetermined level of congestion during the first one of the one or more respective predetermined windows of time, as determined at the first time, causing a second electronic device of the second delivery driver to display an additional delivery request to fulfill the additional driver pickup of the additional order at the first one of the one or more respective stores by the second delivery driver during the first one of the one or more respective predetermined windows of time and the additional delivery of the additional order to the additional customer by the second delivery driver.

10. The method of claim 9, wherein the method further comprises, when the designated pickup area at the first one of the one or more respective stores exceeds the predetermined level of congestion during the first one of the one or more respective predetermined windows of time:

not causing the second electronic device of the second delivery driver to display the additional delivery until the designated pickup area at the first one of the one or more respective stores falls below the predetermined level of congestion.

11. The method of claim 10, wherein the method further comprises, when the designated pickup area at the first one of the one or more respective stores exceeds the predetermined level of congestion during the first one of the one or more respective predetermined windows of time, as determined at the first time:

at a second time during the first one of the one or more respective predetermined windows of time that is after the first time, determining when the designated pickup area at the first one of the one or more respective stores exceeds the predetermined level of congestion; and when the designated pickup area at the first one of the one or more respective stores does not exceed the predetermined level of congestion during the first one of the one or more respective predetermined windows of time, as determined at the second time, causing the second electronic device of the second delivery driver to display the additional delivery request to fulfill the additional driver pickup of the additional order at the first one of the one or more respective stores by the second delivery driver during the first one of the one or more respective predetermined windows of time and the additional delivery of the additional order to the additional customer by the second delivery driver.

12. The method of claim 9, wherein determining when the designated pickup area at the first one of the one or more respective stores exceeds the predetermined level of congestion comprises:

determining when the designated pickup area at the first one of the one or more respective stores exceeds the predetermined level of congestion using both (a) the real-time congestion data of the designated pickup area of the first one of the one or more respective stores and (b) the historical congestion data of the designated pickup area of the first one of the one or more respective stores.

13. The method of claim 9, wherein:

the method further comprises continuously receiving one or more mobile check-ins from:
(1) customers of the plurality of customers for customer pickups of the plurality of orders, the one or more mobile check-ins from the customers of the plurality of customers indicating that the customers are (i) en route to the first one of the one or more respective stores or (ii) in the designated pickup area of the first one of the one or more respective stores; or
(2) the one or more respective delivery drivers for the one or more respective delivery orders of the plurality of orders, the one or more mobile check-ins from the one or more respective delivery drivers indicating that the one or more respective delivery drivers are (i) en route to the first one of the one or more respective stores or (ii) in the designated pickup area of the first one of the one or more respective stores; and the real-time congestion data comprises at least one of:
a number of the one or more mobile check-ins within a predetermined period of time; or
real-time congestion data from cameras monitoring the designated pickup area of the first one of the one or more respective stores, the cameras configured to determine a number of vehicles in the designated pickup area of the first one of the one or more respective stores.

14. The method of claim 9, wherein (b) the historical congestion data is based on at least one of:
a number of customer pickups; or
a number of driver pickups at (1) a particular time of day, (2) during a particular day of a week, or (3) during a particular day of a year.

15. The method of claim 9, wherein:
a second order of the plurality of orders comprises the respective pickup order; and
the customer pickup of the respective pickup order at the respective store by the respective customer of the plurality of customers is scheduled during a predetermined window of time when the respective customer places the respective pickup order.

16. The method of claim 9, wherein:
the designated pickup area comprises a plurality of parking spaces at the first one of the one or more respective stores; and
the first one of the one or more respective delivery drivers and the second delivery driver comprise crowd-sourced delivery drivers for one or more third-party delivery services.

17. The system of claim 1, wherein causing the first electronic device of the first one of the one or more respective delivery drivers to display the additional delivery request comprises:
placing a call to a delivery service call center; or
sending a message to a delivery service application programming interface.

18. The method of claim 9, wherein causing the first electronic device of the first one of the one or more respective delivery drivers to display the additional delivery request comprises:
placing a call to a delivery service call center; or sending a message to a delivery service application programming interface.

19. The system of claim 1, wherein:
determining when the designated pickup area exceeds the predetermined level of congestion comprises:
    determining, using (b) the historical congestion data of the designated pickup area of the first one of the one or more respective stores, when the designated pickup area at the first one of the one or more respective stores exceeds the predetermined level of congestion; and the one or more non-transitory storage devices storing the computing instructions are further configured to run on the one or more processors and perform:
    not causing the first electronic device of the first one of the one or more respective delivery drivers to display the additional delivery request when the designated pickup area at the first one of the one or more respective stores will exceed the predetermined level of congestion, as determined using (b) the historical congestion data of the designated pickup area of the first one of the one or more respective stores.

20. The method of claim 9, wherein:
determining when the designated pickup area exceeds the predetermined level of congestion comprises:
    determining, using (b) the historical congestion data of the designated pickup area of the first one of the one or more respective stores, when the designated pickup area at the first one of the one or more respective stores exceeds the predetermined level of congestion; and the method further comprises:
    not causing the first electronic device of the first one of the one or more respective delivery drivers to display the additional delivery request to the second electronic device of the second delivery driver when the designated pickup area at the first one of the one or more respective stores will exceed the predetermined level of congestion, as determined using (b) the historical congestion data of the designated pickup area of the first one of the one or more respective stores.

\* \* \* \* \*